(12) United States Patent
Yang et al.

(10) Patent No.: US 9,199,307 B2
(45) Date of Patent: Dec. 1, 2015

(54) METHOD FOR PREPARING A TANTALUM POWDER

(75) Inventors: Guoqi Yang, Shizuishan (CN); Wenfeng Shi, Shizuishan (CN); Xifang Bao, Shizuishan (CN); Yong Li, Shizuishan (CN); Zhongxiang Li, Shizuishan (CN); Zhangong Dong, Shizuishan (CN); Xiaoyan Yang, Shizuishan (CN)

(73) Assignee: Ningxia Orient Tantalum Industry Co., Ltd., Ningxia (CN)

( * ) Notice: Subject to any disclaimer, the term of this patent is extended or adjusted under 35 U.S.C. 154(b) by 18 days.

(21) Appl. No.: 13/564,907

(22) Filed: Aug. 2, 2012

(65) Prior Publication Data

US 2012/0291593 A1   Nov. 22, 2012

Related U.S. Application Data

(62) Division of application No. 12/718,630, filed on Mar. 5, 2010, now abandoned.

(30) Foreign Application Priority Data

Mar. 5, 2009 (CN) .......................... 2009 1 0119165

(51) Int. Cl.
*B22F 9/24* (2006.01)
*B22F 1/00* (2006.01)
(Continued)

(52) U.S. Cl.
CPC ................. *B22F 1/0014* (2013.01); *B22F 9/24* (2013.01); *H01G 9/042* (2013.01); *H01G 9/0525* (2013.01)

(58) Field of Classification Search
CPC ...... C22B 34/20; C22B 34/24; H01G 9/0525; H01G 9/042

USPC .......... 75/228–250, 255, 252–254, 331–343, 75/351–374, 622; 148/422; 420/427; 423/62
See application file for complete search history.

(56) References Cited

U.S. PATENT DOCUMENTS 4,555,268 A    11/1985 Getz
4,684,399 A *  8/1987 Bergman et al. ................ 75/363
(Continued)

FOREIGN PATENT DOCUMENTS

CN    1238251    12/1999
CN    1382548    12/2002
(Continued)

OTHER PUBLICATIONS

Professional translation of JP 02-070028, published originally in Japanese on Mar. 8, 1990.*
(Continued)

*Primary Examiner* — Scott Kastler
*Assistant Examiner* — Vanessa Luk
(74) *Attorney, Agent, or Firm* — Meyertons, Hood, Kivlin, Kowert & Goetzel, P.C.; Eric B. Meyertons

(57) ABSTRACT

The present invention relates to the tantalum powder and the process for preparing the same, and also relates to the electrolytic capacitor anode made of the tantalum powder. More particularly, the present invention relates to the tantalum powder having a BET surface area not more than 0.530 m$^2$/g, Fisher mean particle size not less than 3.00 μm. The present invention relates to the process for preparing the tantalum powder, wherein the tantalum powder is prepared through reducing tantalum compound with a reducing agent, wherein the tantalum powder as seed is added during reduction, and said tantalum powder as seed is the tantalum powder that has been milled.

6 Claims, 3 Drawing Sheets

(51) Int. Cl.
*H01G 9/042* (2006.01)
*H01G 9/052* (2006.01)

(56) References Cited

U.S. PATENT DOCUMENTS

| | | |
|---|---|---|
| 5,211,741 A | 5/1993 | Fife |
| 2007/0068341 A1* | 3/2007 | Cheng et al. ............ 75/255 |
| 2008/0087138 A1* | 4/2008 | Scholl et al. ............ 75/343 |
| 2010/0226070 A1 | 9/2010 | Yang et al. |

FOREIGN PATENT DOCUMENTS

| | | | |
|---|---|---|---|
| CN | 101182602 | 5/2008 | |
| JP | 60131901 | 7/1985 | |
| JP | 02-070028 | * 3/1990 | ............ C22B 34/20 |

OTHER PUBLICATIONS

Jiaqi et al. "The effect of seeds on preparation of α-Al2O3 powders by hydrothermal synthesis method" China Ceramic Industry, vol. 13 (1), 19-22, 2006.
Luntao et al. "Microstructure of tantalum powder reduced by sodium" Powder Metallurgy and Material Science and Engineering (P/M MS/E), 295-298, 1997.
Honddong et al. "Progress in High Capacity of Tantalum Powder" Chinese Journal of Rare Metals, vol. 27(1), 35-38, 2003.
International Search Report for PCT/CN2010/000266, mail date Jun. 17, 2010.
Office Action for U.S. Appl. No. 12/718,630 issued May 29, 2012.
Office Action for Mexican Patent Application No. MX/a/2011/009311 issued Oct. 9, 2013.
Office Action for Mexican Patent Application No. MX/a/2011/009311 issued Nov. 24, 2014.

* cited by examiner

METHOD FOR PREPARING A TANTALUM POWDER

PRIORITY CLAIM

This application is a Divisional of U.S. patent application Ser. No. 12/718,630 entitled "TANTALUM POWDER, METHOD FOR PREPARING THE SAME, AND ELECTROLYTIC CAPACITOR ANODE MADE OF THE TANTALUM POWDER" filed on Mar. 5, 2010 now abandoned.

BACKGROUND OF THE INVENTION

1. Field of the Invention

The present invention relates to tantalum powder and the preparation of the same, and also relates to the electrolytic capacitor anode made of the tantalum powder. More particularly, the present invention relates to the improved powder for manufacturing sintered tantalum capacitor anode, and the method for preparing the same.

2. Description of the Relevant Art

Tantalum powder is usually prepared by means of making a tantalum metal compound reacting with a reducing agent, or hydrogenating and pulverizing the dense metal. Generally, the tantalum powder obtained by means of the former method is porous basic agglomerates having high specific surface area composed of many primary particles, and the tantalum powder obtained by the later method is of high purity, but with low specific surface area.

Typically, sintered tantalum capacitor is made as following steps: compressing tantalum powder to form a pellet, sintering the pellet in a vacuum furnace to form a porous body, subsequently, anodizing the porous body in suitable electrolyte liquid, such as diluted phosphoric acid, to form continuous dielectric oxide film on the surface of the porous sintered body.

Generally, it is desired that an electrolytic capacitor shall have performance characteristics of higher specific capacitance, lower DC leakage and higher breakdown voltage. Since electrolytic capacitor has a lot of useful properties, it has been used in a wide ranging field.

The tantalum powder for manufacturing electrolytic capacitor for high voltage field must have good electric performance, such as higher capacitance and higher breakdown voltage. Usually, for same type of tantalum powder, the larger the specific surface area of the tantalum powder is, the more complex of the particles of the powder are, and the lower the breakdown voltage is. The tantalum powder having poor tolerance of high voltage can hardly be used for high voltage field. The BET surface area of tantalum powder produced by reduction of potassium fluorotantalate with sodium is 0.2~6.0 $m^2/g$.

In the high voltage tantalum powder field, many researchers have made great efforts for improving the agglomerating performance of tantalum powder, for increasing the capacitance and breakdown voltage of tantalum powder. WO 93/03, 191, U.S. Pat. Nos. 4,740,238, 5,211,741, 5,261,942 disclosed improved flake tantalum powder and processes for producing flake tantalum powder, but the processes are complex, difficult to control, and the cost is high, thus the application of these technologies is limited.

Accordingly, there is a need in the prior art for the tantalum powder that can be used in high voltage electrolytic capacitor. Particularly, it is desired that the tantalum powder have high capacitance, excellent performance on DC leakage and good voltage tolerance. Furthermore, it is needed a simple, low cost and easily-controlled process in which tantalum powder with the excellent performance and having high specific capacitance and good tolerance of high voltage can be prepared.

SUMMARY OF THE INVENTION

An object of the present invention is to provide tantalum powder that could be used in high voltage electrolytic capacitor.

Another object of the present invention is to provide tantalum powder with high specific capacitance.

Still another object of the present invention is to provide tantalum powder with excellent performance on DC leakage.

Further object of the invention is to provide tantalum powder having good voltage tolerance.

In order to achieve said objects, the inventors find that, by changing the type of morphology of tantalum powder which is added as seed in the reducing process, the particle morphology of the product tantalum powder and the porosity of the anode can be improved, and thus the properties, including DC leakage and breakdown voltage could be improved, whereby the tantalum powder that can be used in the high voltage electrolytic capacitor is obtained.

Particularly, through one or more of the following various solutions, the present invention realizes one or more of said objects:

(1) Tantalum powder, wherein the tantalum powder has a BET surface area of not more than 0.530 $m^2/g$, and Fisher mean particle size of not less than 3.00 μm.

(2) The tantalum powder according to (1), wherein said BET surface area is not more than 0.525 $m^2/g$, preferably not more than 0.520 $m^2/g$, more preferably not more than 0.515 $m^2/g$.

(3) The tantalum powder according to (1), wherein said Fisher mean particle size is not less than 3.05 μm, preferably not less than 3.10 μm.

(4) The tantalum powder according to (1), wherein said tantalum powder has a particle size distribution such that, the particles of −325 mesh comprise not more than 60 vol % of all particles, preferably not more than 55 vol %, more preferably not more than 50 vol %, further preferably not more than 45 vol %, most preferably not more than 40 vol %.

(5) The tantalum powder according to (1), wherein said tantalum powder has an bulk density in a range of 0.5-2.0 $g/cm^3$, preferably 0.5-less than 1.8 $g/cm^3$.

(6) The tantalum powder according to any one of (1)-(5), wherein said BET surface area is not less than 0.2 $m^2/g$, preferably not less than 0.3 $m^2/g$, more preferably not less than 0.4 $m^2/g$.

(7) The tantalum powder according to any one of (1)-(5), wherein said Fisher mean particle size is not more than 5 μm, preferably not more than 4.5 μm, preferably not more than 4 μm, more preferably not more than 3.5 μm.

(8) A process for preparing said tantalum powder according to any one of (1)-(7), wherein the tantalum powder is prepared by reducing tantalum compound with a reducing agent, wherein the tantalum powder as seed is added during reduction, and said tantalum powder as seed is the tantalum powder that has been milled.

(9) The process according to (8), wherein the particle size of the tantalum powder as seed is −60 mesh, preferably −100 mesh.

(10) The process according to (8), wherein the oxygen content of the tantalum powder as seed is not more than 5000 ppm, preferably not more than 2000 ppm.

(11) The process according to (8), wherein the carbon content of the tantalum powder as seed is not more than 40 ppm, preferably not more than 30 ppm.

(12) The process according to (8), wherein the nitrogen content of the tantalum powder as seed is not more than 200 ppm, preferably not more than 150 ppm.

(13) The process according to (8), wherein the hydrogen content of the tantalum powder as seed is not more than 300 ppm, preferably not more than 150 ppm.

(14) The process according to (8), wherein the sum content of iron, nickel and chromium of the tantalum powder as seed is not more than 30 ppm.

(15) The process according to (8), wherein said milling is continuous ball-milling for 5-40 hours, preferably for 10-30 hours in a stirring ball mill.

(16) The process according to (8), wherein the amount of the tantalum powder as seed added is 5-80 mass % of the theoretical reduction amount of the tantalum powder, preferably 10-70 mass %, more preferably 30-60 mass %.

(17) The process according to (8), wherein said process include the following steps:
  (a) mixing tantalum compound with dilution agent and tantalum powder as seed;
  (b) adding reducing agent, and reducing the tantalum compound at a temperature of 700-1000° C.;
  (c) soaking at a temperature of 700-1000° C.;
  (d) removing the tantalum powder.

(18) The process according to any one of (8)-(17), wherein said tantalum compound is at least one selected from of potassium fluorotantalate, sodium fluorotantalate, or the mixture of them.

(19) The process according to any one of (8)-(17), wherein said reducing agent is at least one selected from of metal sodium, potassium or the alloy of them.

(20) The process according to any one of (8)-(17), wherein said diluent is at least one selected from of sodium chloride, potassium chloride, potassium fluoride or the mixture of them.

(21) The process according to any one of (8)-(17), wherein said reduction is carried out at a temperature of 800-1000° C., preferably 850-950° C.

(22) The process according to any one of (8)-(17), wherein the soaking time is 0.5-5 hours, preferably 3-5 hours.

(23) The process according to any one of (8)-(17), wherein the temperature of soaking is 800-1000° C., preferably 900-950° C.

(24) An electrolytic capacitor anode, wherein said anode is manufactured from the tantalum powder selected of any one of (1)-(7).

(25) The electrolytic capacitor anode according to (24), wherein the specific capacitance is in the range of 6000-30000 μFV/g, preferably 10000-30000 μFV/g, more preferably 15000-25000 μFV/g.

(26) The electrolytic capacitor anode according to (24), wherein the energizing voltage is in the range of 100-250V.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
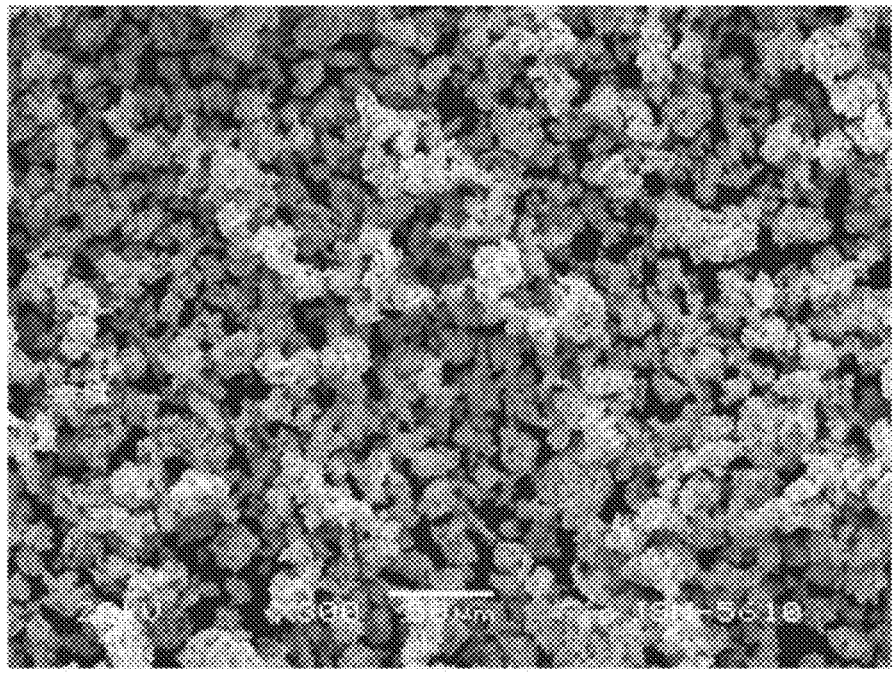
FIG. 1 shows the SEM photograph at 300 magnifications of the sample I.
Figure 2:
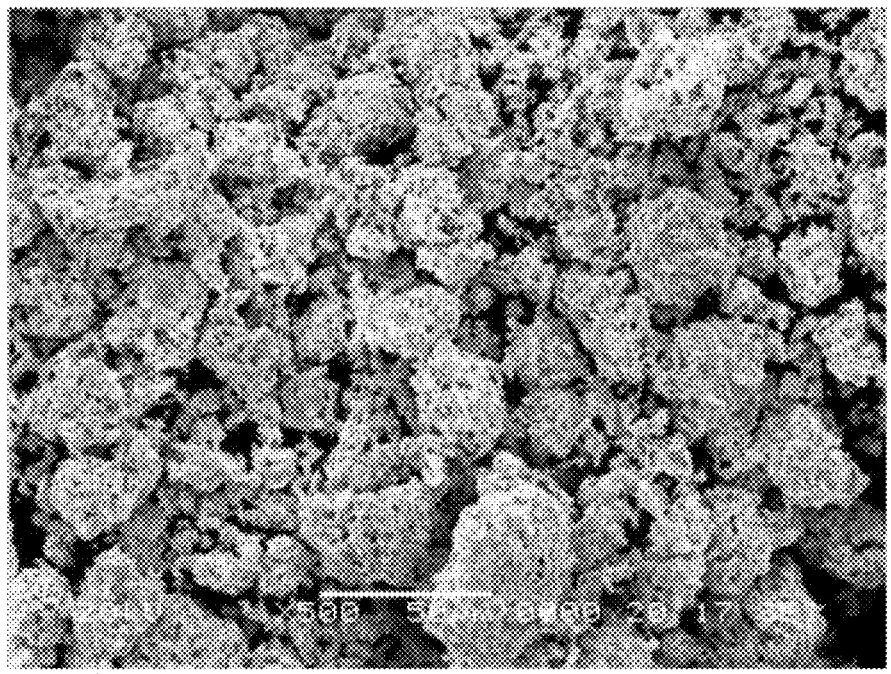
FIG. 2 shows a SEM photograph at 500 magnifications of the sample J.
Figure 3:
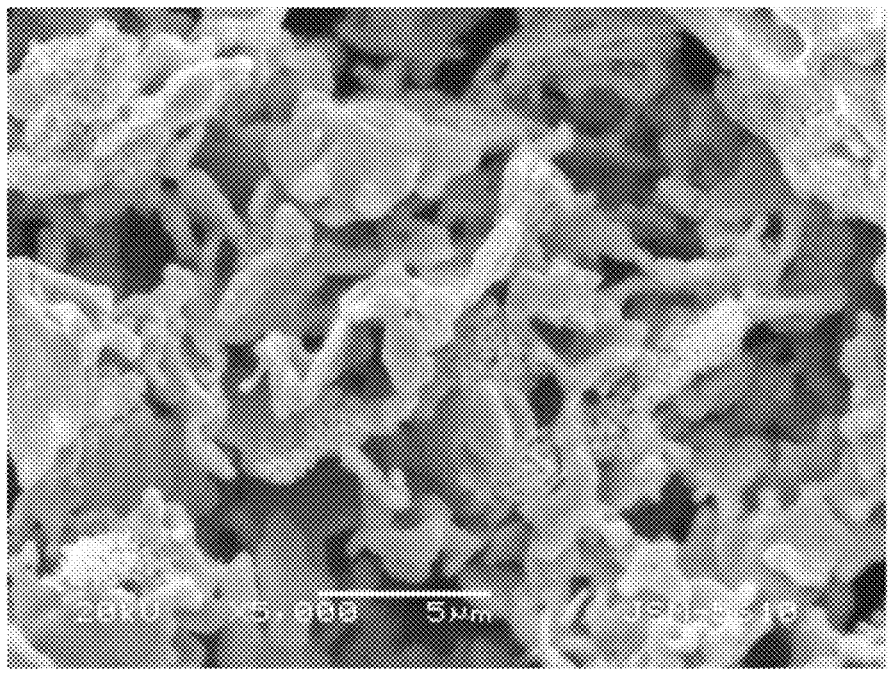
FIG. 3 shows a SEM photograph at 5000 magnifications of the sample I.
Figure 4:
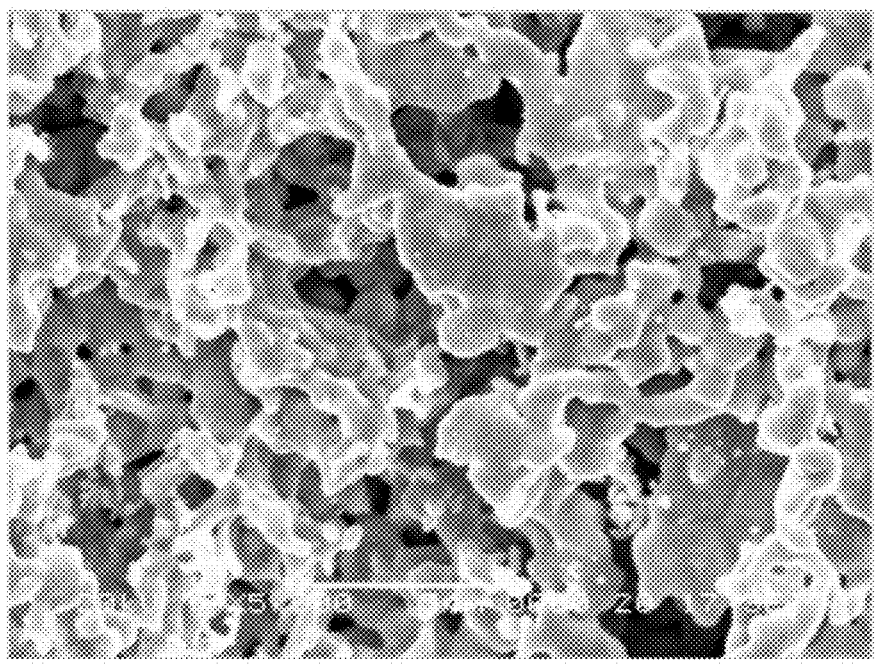
FIG. 4 shows a SEM photograph at 5000 magnifications of the sample J.
Figure 5:
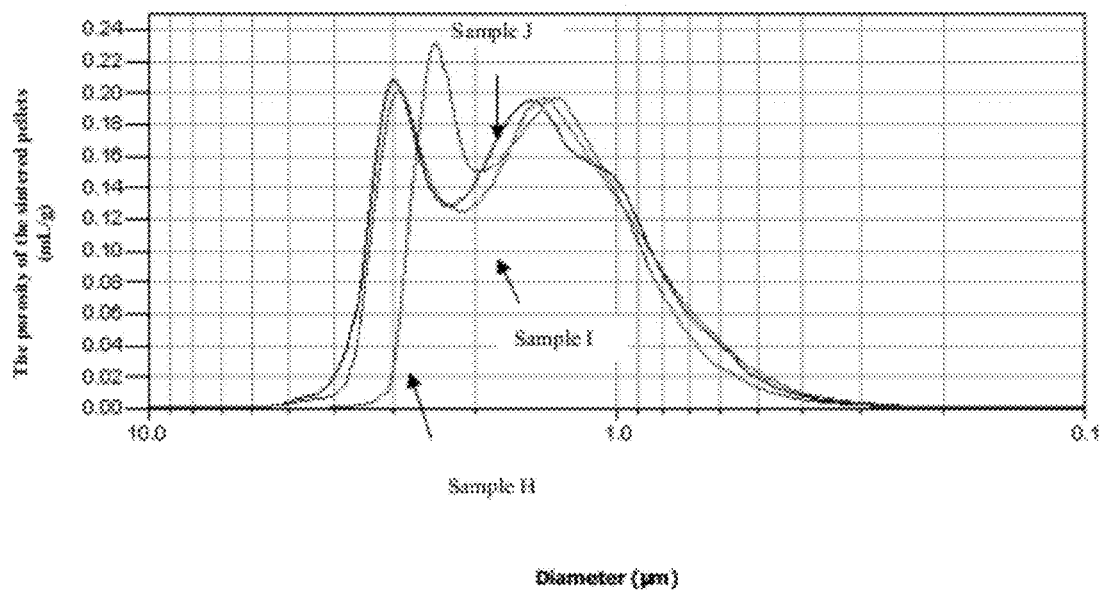
FIG. 5 shows the porosity of the sintered pellets which are sintered at 1500° C./30 min prepared from three different processes.
Figure 6:
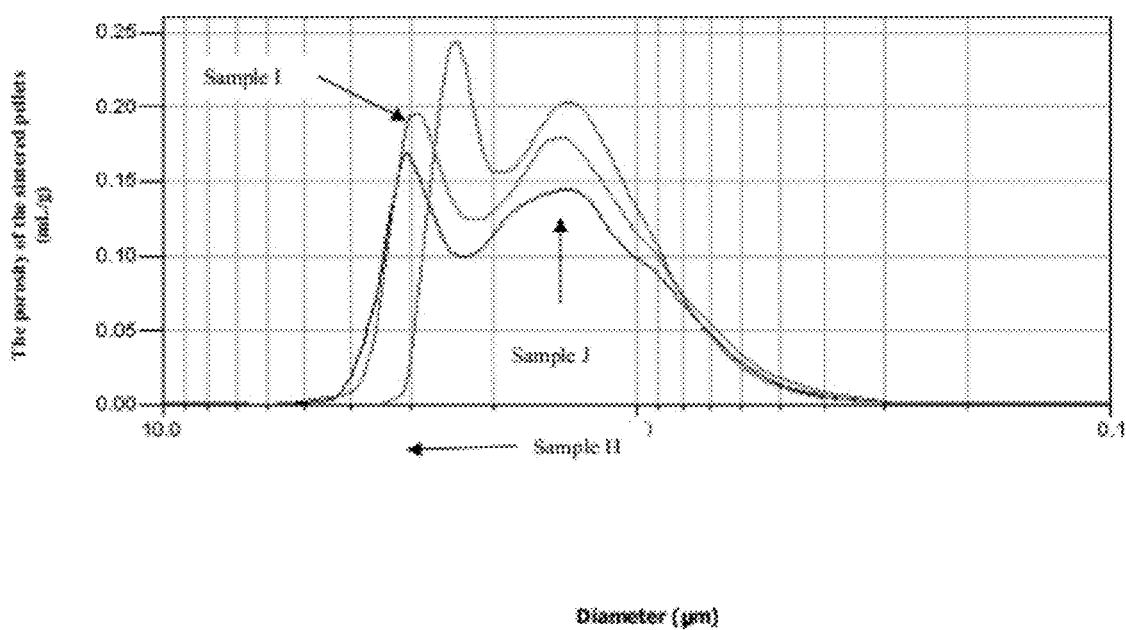
FIG. 6 shows the porosity of the sintered pellets which are sintered at 1550° C./30 min from prepared from three different processes.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In the present specification, unless otherwise indicated, the unit of ppm indicates "parts per million" in a mass basis; the so-called "high voltage" generally indicates the voltage of 100V or higher, especially 100V-250V.

As used in the present application document and well known to those skill in the art, when using the mesh to express the particle size, the "−" or "+" before the mesh number indicates, respectively, that the particle "pass" or "not pass" the screen mesh of said mesh number, for example, "−60 mesh" indicates that those particles pass the screen mesh of 60 mesh, and accordingly, "+200 mesh" indicates that the particles do not pass the screen mesh of 200 mesh. Hence, the particles of "−60-+200 mesh" refer to the particles pass the screen mesh of 60 mesh, but do not pass the one of 200 mesh.

The parameters for characterizing the particle of the powders include: the BET surface area ($m^2/g$) tested by liquid nitrogen absorption process at low temperature, Fisher mean particle size (FSSS/μm) measured by the Fisher sub-sieve analyzer, the bulk density (SBD, $g/cm^3$) measured by Scott bulk density analyzer, the porosity distribution of the anode measured by the Auto mercury pressure analyzer, the particle size distribution of the powders measured by a laser particle size distribution analyzer, the morphology size of the particle measured by a scan electronic microscope and a transmission electron microscope.

The electrolytic capacitor anode are prepared and characterized as follows: pressing tantalum powder into a pellets according to required density and size then, sintering the pellet at a required temperature in a vacuum furnace into a sintered pellet; then maintaining the sintered pellet in 0.01 vol % phosphoric acid solution at 80° C. at constant voltage for a certain time period and anodizing the sintered pellet so as to form an electrolytic capacitor anode.

The devices for analyzing the parameters relating to the present invention are as following:

| Item | Devices | Model | Manufacture |
|---|---|---|---|
| O, N amount | Oxygen and nitrogen analyzer | LECO CS-436 | LECO CS |
| K + Na amount | Atom absorb spectrometry | Varian 220FS/220Z | Varian |
| C amount | Carbon, Sulphur analyzer | LECO CS-406 | LECO CS |
| SBD | Bulk density analyzer | FL4-1 | made according to GB1479-84 |
| CV | LCR precise measurer | HP-4284A | HP |
| BET | BET analyzer | ASAP2010 | Micromerities, USA |
| Porosity | Auto mercury pressure analyzer | AUTOPORE III 9400 | Micromerities, USA |
| Morphology of the particles | Scanning electronic microscope; | JSM-5610LV | Japan Electronics |

The results of BET surface area test can reflect the size of primary particles. The finer the primary particle of the tantalum powder is, the larger the BET surface area is, and generally the higher the specific capacitance of the powder is. The Fisher mean particle size is obtained through measuring the speed of air passed a metal tube filled with powder, the Fisher mean particle size value of a powder is associated with the size of particle, meanwhile, it is related to the extent of the agglomerates. For the as-reduced primary powders produced by reduction, the lower the Fisher mean particle size value of the powder is, the larger the surface area is, the higher the specific capacitance is, and the higher the DC leakage is; but for the agglomerated powder, the powders having different specific surface area may be having similar Fisher mean particle size value; and for the powder with same specific capacitance, the powder with higher agglomeration degree have greater Fisher mean particle size value.

According to the present invention, said tantalum powder is that used for electrolytic capacitor with the energizing voltage of 100V~250V.

According to the present invention, there is no specific limitation on the tantalum powder as seed, as long as it can be added in the reduction process as seed. In a preferred embodiment of the present invention, said tantalum powder as seed (i.e. the milled tantalum powder) has the properties as follows: particle size of −60 mesh, preferably of −100 mesh; the oxygen content of not more than 5000 ppm, preferably not more than 2000 ppm; the carbon content of not more than 40 ppm, preferably not more than 30 ppm; the nitrogen content of not more than 200 ppm, preferably not more than 150 ppm; the hydrogen content of not more than 300 ppm, preferably of not more than 150 ppm; the sum contents of iron, nickel and chromium of not more than 30 ppm.

In the present invention, there is no specific limitation on the process for preparing tantalum powder as seed, but preferably, the tantalum powder as seed is that has been milled. In a preferred embodiment of the present invention, said tantalum powder as seed has been continuously ball-milled for 5-40 hours with a stirring ball-mill.

Preferably, the milling process may include: the start material is stirring ball-milled in a stirring ball mill, with alcohol as the milling medium, to form a flake powder having the aspect ratio of 5-20, then, the impurities in the milled powder are removed by leaching. Said aspect ratio indicates the ratio of the width to thickness of a particle. The aspect ratio can be tested with a scanning electronic microscope. For instance, the aspect ratio can be reliably obtained in this way: dispersing the particles and sticking them solidly to an adhesive tape, observing with a scanning electronic microscope, and testing the radial length and thickness of 2000-3000 particles, calculating the average value of radial length to thickness of these particles.

According to the process of the present invention, the tantalum powders with larger particle size and lower specific surface area can be obtained by adding tantalum powder as seed without changing the system and condition of the process. Hence, the resultant tantalum powder has good sintering-properties, as well as high capacitance at high temperature, high breakdown voltage, low DC leakage and good agglomerating performance. Therefore, the tantalum powder according to the present invention is particularly useful in high voltage electrolytic capacitor.

According to the process of the present invention, there is no specific limitation on the addition amount of the tantalum powder as seed, so long as it's the amount suffices for acting as a seed. In a preferred example of the present invention, said addition amount of the tantalum powder as seed is 5-80 mass % of the theoretical reduction weight, preferably 10-70 mass %, more preferably 30-60 mass %. The so called "the theoretical reduction weight" means the weight of the tantalum powder that can be obtained by the present invention according to theoretical calculation, and which includes the amount of tantalum powder obtained from the reduction and the amount of tantalum powder added as seed. In the present application, all the percentage relating to the amount of tantalum powder as seed were of the above-said meaning.

Moreover, so called "without changing the system and condition of the process" indicates that the tantalum powder is prepared based on conventional process, that is, tantalum metal is prepared by reducing tantalum compound with a reducing agent without changing any process condition. Said process is known to those skilled in the art. According to the present invention, the parameters of the process are not specially limited.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

In the following examples, the sample tantalum powder are prepared with the following process, wherein:

(a) For sample A, D and H: mixing and charging an amount of 150 kg of $K_2TaF_7$ and 160 kg of diluent salt of KCl into a reaction vessel;

(b) For sample B, C, E, F, I and J, the above 150 Kg of $K_2TaF_7$ is partially replaced by the tantalum powder as seed with the amount of tantalum unchanged, and the type of the diluent salt and its addition amount remain unchanged, afterward they are mixed and charged into a reaction vessel;

(c) After charging, heating the charged reaction vessel to 920° C., steadily injecting liquid sodium into the reaction vessel to carry out the reduction under stirring with the stirring rate controlled at 80 revolutions per minute, and the reaction temperature is regulated by controlling the speed of injecting sodium;

(d) soaking at the temperature of 920° C. for 0.5-5 hours, at the end of injecting sodium;

(e) removing the powders from the furnace after cooling, and said sample tantalum powders are obtained.

In the following examples, the tantalum powder as seed is referred as "seed tantalum powder" for short. The seed tantalum powder has the following characteristics: particle size of −100 mesh; 4750 ppm of oxygen content; 35 ppm of carbon content; 170 ppm of nitrogen content; 260 ppm of hydrogen content; and the 25 ppm of the sum contents of iron, nickel and chromium. Please note that, in the following examples, no all the samples are in the scope of the present invention. For convenient comparison, the applicant put the samples according the present invention and the samples not according to the present invention into the same example. Particularly, samples A, D and H are the tantalum powders out of the scope of the present invention (in other words, without the addition of the seed powder in the process), and the sample B, C, E, F, I and J are in the scope of the present invention (in other words, with the addition the seed powder in the process).

EXAMPLE 1

Sample A (not according to the present invention): obtained directly by sodium reduction;

Sample B (according to the present invention): obtained with addition of 10 mass % seed tantalum powder in the reduction;

Sample C (according to the present invention): obtained with addition of 20 mass % seed tantalum powder in the reduction.

TABLE 1

Specific surface area, bulk density and Fisher mean particle size of the samples A, B and C

| Sample | Specific surface area (cm²/g) | Bulk density (g/cm³) | Fisher mean particle size (μm) |
| --- | --- | --- | --- |
| A | 0.5328 | 1.84 | 3.05 |
| B | 0.5120 | 1.78 | 3.15 |
| C | 0.4875 | 1.76 | 3.12 |

TABLE 2

The distribution of the particle size of the samples A, B and C (all percentages are expressed by vol. %, same hereinafter)

| Sample | +60 (%) | −60/+200 (%) | −200/+325 (%) | −325/+400 (%) | −400 (%) |
| --- | --- | --- | --- | --- | --- |
| A | 0.46 | 27.58 | 10.42 | 15.86 | 45.68 |
| B | 0.36 | 28.12 | 12.32 | 13.46 | 45.74 |
| C | 0.48 | 30.26 | 15.46 | 13.88 | 39.92 |

An amount of 0.5 g of the tantalum powder from Samples A, B and C were respectively pressed into pellets having a density of 5.0 g/cm³. The pellets were sintered in a vacuum furnace at a pressure of $10^{-3}$ Pa, at different temperatures of 1450° C., 1500° C., 1550° C. and 1600° C. for 30 minutes to form sintered pellets. Said sintered pellets were energized in 0.01 vol % phosphoric acid solution at 100V voltages to form electrolytic capacitor anodes. The properties were measured, and the results are listed in Table 3, 4 and 5.

TABLE 3

The specific capacitance of the electrolytic capacitor anodes from the samples A, B and C sintered at various sintering conditions.

| Sample | 1450° C./ 30 min | 1500° C./ 30 min | 1550° C./ 30 min | 1600° C./ 30 min |
| --- | --- | --- | --- | --- |
| A | 25680 | 23060 | 17328 | 13436 |
| B | 25565 | 22140 | 18510 | 13725 |
| C | 25326 | 20100 | 17680 | 14015 |

TABLE 4

The DC leakage of the electrolytic capacitor anodes from the sample A, B and C sintered at various sintering conditions

| Sample | 1450° C./ 30 min | 1500° C./ 30 min | 1550° C./ 30 min | 1600° C./ 30 min |
| --- | --- | --- | --- | --- |
| A | 0.42 | 0.18 | 0.21 | 0.32 |
| B | 0.38 | 0.17 | 0.19 | 0.30 |
| C | 0.37 | 0.17 | 0.18 | 0.28 |

TABLE 5

The shrinkage of the electrolytic capacitor anodes from the samples A, B and C sintered at various sintering conditions.

| Sample | 1450° C./ 30 min | 1500° C./ 30 min | 1550° C./ 30 min | 1600° C./ 30 min |
| --- | --- | --- | --- | --- |
| A | 7.4 | 9.6 | 10.8 | 14.8 |
| B | 6.8 | 9.4 | 10.6 | 15.4 |
| C | 5.5 | 7.8 | 8.4 | 11.4 |

EXAMPLE 2

Sample D (not according to the present invention): obtained directly by sodium reduction Sample E (according to the present invention): obtained with addition of 30 mass % seed tantalum powder in the reduction Sample F (according to the present invention): obtained with addition of 50 mass % seed tantalum powder in the reduction

TABLE 6

The specific surface area, bulk density and Fisher mean particle size of the samples D, E and F.

| Sample | Specific surface area (cm²/g) | bulk density (g/cm³) | Fisher mean particle size (μm) |
| --- | --- | --- | --- |
| D | 0.5238 | 1.82 | 2.90 |
| E | 0.4662 | 1.68 | 3.30 |
| F | 0.4584 | 1.63 | 3.35 |

TABLE 7

The particle size distribution of the samples D, E and F.

| Sample | +60 (%) | −60/+200 (%) | −200/+325 (%) | −325/+400 (%) | −400 (%) |
| --- | --- | --- | --- | --- | --- |
| D | 0.56 | 26.62 | 10.86 | 16.42 | 45.54 |
| E | 0.62 | 30.12 | 22.32 | 12.80 | 34.14 |
| F | 0.36 | 31.86 | 21.46 | 13.20 | 33.12 |

An amount of 0.5 g of the tantalum powder from samples D, E and F were respectively pressed into pellets having density of 5.0 g/cm³. The pellets were sintered in a vacuum furnace at a pressure of $10^{-3}$ Pa, at different temperatures of 1450° C., 1500° C., 1550° C. and 1600° C. for 30 minutes to form a sintered pellets. Said sintered pellets were energized in 0.01 vol % phosphoric acid solution at 100V voltages to form electrolytic capacitor anodes. The properties were measured, and the results are listed in Table 8, 9 and 10.

TABLE 8

The specific capacitance of the electrolytic capacitor anodes from the samples D, E and F sintered at various sintering conditions and energized at 100 V.

| Sample | 1450° C./ 30 min | 1500° C./ 30 min | 1550° C./ 30 min | 1600° C./ 30 min |
| --- | --- | --- | --- | --- |
| D | 25700 | 22980 | 17160 | 13360 |
| E | 24875 | 23120 | 18236 | 15238 |
| F | 24207 | 23740 | 19508 | 16848 |

TABLE 9

The DC leakage of the anodes from the samples D, E and F sintered at various sintering conditions and energized at 100 V.

| Sample | 1450° C./ 30 min | 1500° C./ 30 min | 1550° C./ 30 min | 1600° C./ 30 min |
| --- | --- | --- | --- | --- |
| D | 0.40 | 0.17 | 0.21 | 0.32 |
| E | 0.35 | 0.16 | 0.18 | 0.26 |
| F | 0.32 | 0.16 | 0.18 | 0.22 |

TABLE 10

The shrinkage of the anodes from the samples D, E and F sintered at various sintering conditions and energized at 100 V.

| Sample | 1450° C./ 30 min | 1500° C./ 30 min | 1550° C./ 30 min | 1600° C./ 30 min |
| --- | --- | --- | --- | --- |
| D | 5.0 | 20.1 | 28.2 | 36.7 |
| E | 3.0 | 12.6 | 16.2 | 28.6 |
| F | 2.0 | 7.4 | 11.3 | 23.2 |

An amount of 0.5 g of said samples D, E and F were respectively pressed into pellets having density of 5.0 g/cm³. The pellets were sintered in a vacuum furnace at a pressure of $10^{-3}$ Pa, at different temperatures of 1450° C., 1500° C., 1550° C. and 1600° C. for 30 minutes to form sintered pellets. Said sintered pellets were energized in 0.01 vol % phosphoric acid solution at 160V voltages to form electrolytic capacitor anodes. The properties were measured, and the results are listed in Table 11, 12 and 13.

TABLE 11

The specific capacitance of the electrolytic capacitor anodes from the samples D, E and F sintered at various sintering conditions and energized at 160 V.

| Sample | 1450° C./ 30 min | 1500° C./ 30 min | 1550° C./ 30 min | 1600° C./ 30 min |
| --- | --- | --- | --- | --- |
| D | 23700 | 18600 | 15120 | 12980 |
| E | 21980 | 19800 | 17680 | 14960 |
| F | 22340 | 20400 | 18150 | 15200 |

TABLE 12

The DC leakage of the electrolytic capacitor anodes from the samples D, E and F sintered at various sintering conditions and energized at 160 V.

| Sample | 1450° C./ 30 min | 1500° C./ 30 min | 1550° C./ 30 min | 1600° C./ 30 min |
| --- | --- | --- | --- | --- |
| D | 0.52 | 0.35 | 0.31 | 0.32 |
| E | 0.41 | 0.29 | 0.28 | 0.27 |
| F | 0.32 | 0.27 | 0.25 | 0.25 |

TABLE 13

The shrinkage of the anodes from the samples D, E and F sintered at various sintering conditions and energized at 160 V.

| Sample | 1450° C./ 30 min | 1500° C./ 30 min | 1550° C./ 30 min | 1600° C./ 30 min |
| --- | --- | --- | --- | --- |
| D | 4.3 | 15.4 | 20.6 | 28.6 |
| E | 2.1 | 6.8 | 12.4 | 21.5 |
| F | 1.8 | 5.9 | 9.8 | 18.6 |

EXAMPLE 3

Sample H (not according to the present invention): obtained directly by sodium reduction Sample I (according to present invention): obtained with addition of 50 mass % seed tantalum powder in the reduction Sample J (according to present invention): obtained with addition of 70 mass % seed tantalum powder in the reduction

TABLE 14

The specific surface area, apparent density and Fisher mean particle size of the samples H, I and J.

| Sample | surface area (cm²/g) | bulk density (g/cm³) | Fisher mean particle size (μm) |
| --- | --- | --- | --- |
| H | 0.5348 | 1.80 | 2.98 |
| I | 0.4568 | 1.66 | 3.28 |
| J | 0.4532 | 1.60 | 3.30 |

TABLE 15

The particle size distributions of the samples H, I and J (vol. %).

| Sample | +60 | −60/+200 | −200/+325 | −325/+400 | −400 |
| --- | --- | --- | --- | --- | --- |
| H | 0.56 | 25.52 | 11.38 | 14.98 | 47.56 |
| I | 0.36 | 30.98 | 24.66 | 11.88 | 32.12 |
| J | 0.52 | 32.86 | 27.52 | 10.24 | 28.86 |

An amount of 0.5 g of said powder samples H, I and J were respectively pressed into pellets having density of 5.0 g/cm³. The pellets were sintered in a vacuum furnace at a pressure of $10^{-3}$ Pa, at different temperatures of 1450° C., 1500° C., 1550° C. and 1600° C. for 30 minutes to form sintered pellets. Said sintered pellets were energized in 0.01 vol % phosphoric acid solution at 160V voltages to form electrolytic capacitor anodes. The properties were measured, and the results are listed in Table 16, 17 and 18.

TABLE 16

The specific capacitance of the electrolytic capacitor
anodes from the samples H, I and J sintered at various
sintering conditions and energized at 160 V.

| Sample | 1450° C./<br>30 min | 1500° C./<br>30 min | 1550° C./<br>30 min | 1600° C./<br>30 min |
|---|---|---|---|---|
| H | 23460 | 17580 | 14420 | 12650 |
| I | 21320 | 19620 | 17330 | 15180 |
| J | 20380 | 20560 | 17650 | 15210 |

TABLE 17

The DC leakage of the electrolytic capacitor anodes
from the samples H, I and J sintered at various
sintering conditions and energized at 160 V.

| Sample | 1450° C./<br>30 min | 1500° C./<br>30 min | 1550° C./<br>30 min | 1600° C./<br>30 min |
|---|---|---|---|---|
| H | 0.66 | 0.46 | 0.36 | 0.35 |
| I | 0.48 | 0.28 | 0.27 | 0.26 |
| J | 0.36 | 0.28 | 0.26 | 0.24 |

TABLE 18

The shrinkage of the electrolytic capacitor anodes
from the samples H, I and J sintered at various
sintering conditions and energized at 160 V.

| Sample | 1450° C./<br>30 min | 1500° C./<br>30 min | 1550° C./<br>30 min | 1600° C./<br>30 min |
|---|---|---|---|---|
| H | 4.8 | 15.8 | 18.6 | 27.4 |
| I | 2.0 | 6.2 | 10.2 | 17.8 |
| J | 0.8 | 5.6 | 9.4 | 16.6 |

An amount of 0.5 g of tantalum powder from sample I, J and H were respectively pressed into pellets having a density of 5.0 g/cm³. The pellets were sintered in a vacuum furnace at a pressure of 10⁻³ Pa, at different temperatures of 1450° C., 1500° C., 1550° C. and 1600° C. for 30 minutes to form sintered pellets. Said sintered pellets were anodized in 0.01 vol % phosphoric acid solution at 200V voltages to form electrolytic capacitor anodes. The properties were measured, and the results are listed in Table 19, 20 and 21.

TABLE 19

The specific capacitance of the electrolytic capacitor
anodes from the samples H, I and J sintered at various
sintering conditions and energized at 200 V.

| Sample | 1450° C./<br>30 min | 1500° C./<br>30 min | 1550° C./<br>30 min | 1600° C./<br>30 min |
|---|---|---|---|---|
| H | 17652 | 15420 | 12180 | 10250 |
| I | 17180 | 17230 | 15830 | 14360 |
| J | 17268 | 17280 | 15850 | 14380 |

TABLE 20

The DC leakage of the electrolytic capacitor anodes
from the samples H, I and J sintered at various
sintering conditions and energized at 200 V.

| Sample | 1450° C./<br>30 min | 1500° C./<br>30 min | 1550° C./<br>30 min | 1600° C./<br>30 min |
|---|---|---|---|---|
| H | 1.32 | 0.76 | 0.52 | 0.40 |
| I | 0.86 | 0.42 | 0.36 | 0.32 |
| J | 0.82 | 0.40 | 0.36 | 0.30 |

TABLE 21

The shrinkage of the electrolytic capacitor anodes
from the samples H, I and J sintered at various
sintering conditions and energized at 200 V.

| Sample | 1450° C./<br>30 min | 1500° C./<br>30 min | 1550° C./<br>30 min | 1600° C./<br>30 min |
|---|---|---|---|---|
| H | 4.8 | 15.8 | 18.6 | 27.4 |
| I | 2.0 | 6.2 | 10.2 | 17.8 |
| J | 0.8 | 5.6 | 9.4 | 16.6 |

As described above, the tantalum powder according to the present invention has proper bulk density. The tantalum powder according to the present invention has better agglomerating effect and substantially lower ratio of fine particles, comparing with those in the prior art. Particularly, the particles of −325 mesh only comprise not more than 60 vol % of all particles. The electrolytic capacitor anodes manufactured from the tantalum powder, at high energizing voltage, has comparative or even higher specific capacitance and lower leakage, and has improved sintering performance (shrinkage). Thus, it can be seen that the tantalum powder according to the present invention especially suitable for high voltage electrolytic capacitor. Moreover, as can be seen by comparing the samples F and I, which are prepared under the identical process parameters, the process according to the present invention has excellent reproducibility which is very advantageous for the practice.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A process for preparing tantalum powder wherein the tantalum powder has a BET surface area of not more than 0.530 m²/g, and Fisher mean particle size of not less than 3.00 μm, wherein the tantalum powder is prepared by the process comprising:
mixing a tantalum compound with a dilution agent and tantalum powder as seed, wherein the tantalum powder as seed is tantalum powder that has been milled to the form of a flake powder having an aspect ratio of 5 to 20, and wherein the particle size of the tantalum powder as seed is −60 mesh;

reducing the tantalum compound by adding a reducing agent to a molten mixture of the tantalum compound, dilution agent and tantalum powder as seed, wherein the reduction is carried out at a temperature of 800-1000° C.;

soaking at a temperature of 700-1000° C.; and removing the tantalum powder; wherein the produced tantalum powder has a particle distribution in which particles of −325 mesh represent less than 60 vol % of all particles in the produced tantalum powder.

2. The process according to claim 1, wherein said tantalum powder that has been milled is milled by continuous ball-milling for 5-40 hours in a stirring ball mill.

3. The process according to claim 1, wherein the amount of the tantalum powder as seed added is 5-80 mass % of the theoretical reduction amount of the tantalum powder.

4. The process according to claim 3, wherein the amount of the tantalum powder as seed added is 10-70 mass % of the theoretical reduction amount of the tantalum powder.

5. The process according to claim 4, wherein the amount of the tantalum powder as seed added is 30-60 mass % of the theoretical reduction amount of the tantalum powder.

6. The process according to claim 1, wherein said tantalum powder that has been milled is milled by continuous ball-milling for 10-30 hours in a stirring ball mill.

* * * * *